(12) United States Patent
Mitchell

(10) Patent No.: US 6,686,556 B2
(45) Date of Patent: Feb. 3, 2004

(54) SOLID-WASTE ENERGY PLANT USING CATALYTIC IONIC-IMPACT DECOMPOSITION AND COMBUSTION PRODUCT REGENERATION

(76) Inventor: C. Kenneth Mitchell, 7428 Edgewater Ave., Las Vegas, NV (US) 89123

( * ) Notice: Subject to any disclaimer, the term of this patent is extended or adjusted under 35 U.S.C. 154(b) by 74 days.

(21) Appl. No.: 10/117,601

(22) Filed: Apr. 4, 2002

(65) Prior Publication Data

US 2002/0144981 A1 Oct. 10, 2002

Related U.S. Application Data

(60) Provisional application No. 60/281,864, filed on Apr. 4, 2001.

(51) Int. Cl.$^7$ ................................................. F23J 7/00
(52) U.S. Cl. ............................ 219/121.48; 219/121.38; 219/121.59; 219/121.36; 373/18; 110/250; 110/233; 110/346
(58) Field of Search ........................ 219/121.36, 121.43, 219/121.37, 121.38, 121.59, 121.48; 373/18–22; 110/250, 235, 242, 345, 346; 363/65; 588/901

(56) References Cited

U.S. PATENT DOCUMENTS 4,380,469 A * 4/1983 Sulzbacher .................... 75/38
5,369,241 A    11/1994 Taylor et al. .......... 219/121.47
6,018,471 A *  1/2000 Titus et al. .................. 363/126
6,168,709 B1   1/2001 Etter ............................ 208/131
6,250,236 B1   6/2001 Feizollahi .................... 110/346
6,380,507 B1   4/2002 Childs .................... 219/121.37

* cited by examiner

Primary Examiner—Mark Paschall
(74) Attorney, Agent, or Firm—Thomas Schneck; Mark Protsik

(57) ABSTRACT

A solid-waste conversion plant produces useful products and electrical energy in a closed system with zero emission of pollutants into the atmosphere. The plant is characterized by catalytic ionic-impact chambers having a pair of electrodes that establish an electric arc. The electric arc breaks down solid waste molecules into a plasma of atomic constituents which exothermically recombine into simple molecules upon leaving the plasma. A primary chamber converts carbon-based waste into solidifiable metal, sulfur and glassy slag extractable from the bottom of the chamber, and into gas containing CO, $H_2$, and $CH_4$. A second chamber contains high carbon waste input that is converted by the arc into incandescent coke, which converts $CO_2$ and $H_2O$ in the gas from the first chamber into more CO, $H_2$ and $CH_4$, thereby forming a fuel gas. The fuel gas is combusted in gas turbine generators to produce electricity for operating the electric arcs, plus a sellable surplus. The flue gases are regenerated in a third chamber substantially like the second. At least some of the $CO_2$, $H_2$ and $CH_4$, may be extracted from the plant for commercial sale.

15 Claims, 1 Drawing Sheet

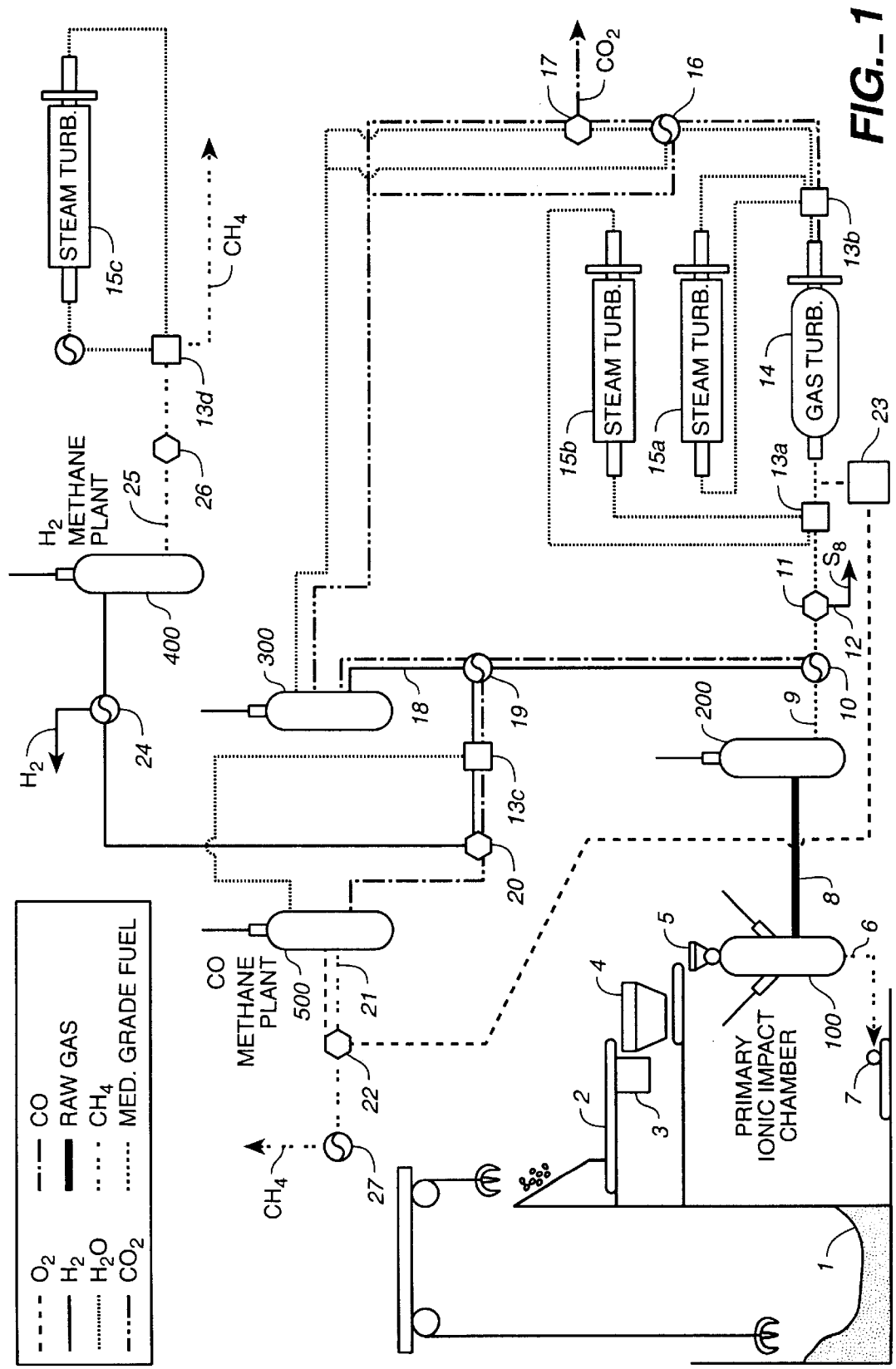

SOLID-WASTE ENERGY PLANT USING CATALYTIC IONIC-IMPACT DECOMPOSITION AND COMBUSTION PRODUCT REGENERATION

CROSS-REFERENCE TO RELATED APPLICATION

The present application claims priority under 35 U.S.C. §119(e) from prior U.S. provisional application No. 60/281,864, filed Apr. 4, 2001.

TECHNICAL FIELD

The invention relates to solid waste conversion and energy production facilities, and in particular to power plants that are specially adapted for conversion of solid municipal and industrial waste into carbonaceous fuel and other marketable products and the use of such fuel in electricity generation. Such plants that have zero or substantially reduced airborne pollution emissions are especially relevant.

BACKGROUND ART

Approximately ninety percent of the carbon-based waste produced in industrial societies is interred in land fills. Disposal of municipal and industrial solid waste has become a major issue due to space limitations for land fills. Land fill interment adds to environmental pollution and the energy contained therein is lost to human use. Industrial use of this wasted energy could significantly impact dependency on fossil fuels. Some waste materials, such as human medical waste, pose public health problems that require their destruction, e.g. by incineration, rather than disposal in a land fill. Gasification of municipal, industrial and medical solid waste material by conventional means, such as incineration and pyrolysis, results in airborne emissions—primarily nitrous and sulfurous gases ($NO_x$ and $SO_x$), ash and other suspended particulate matter (PM), and partially-burned hydrocarbons (HCs), with the mix and amounts of the different pollutants depending on the type of plant, the particular solid waste input into the plant, and the efficiency with which it consumes the solid waste material. Such pollution has frequently resulted in local opposition and site location zoning problems for new waste incineration or pyrolysis facilities.

Approximately sixty percent of the electricity generated in the United States comes from the burning of coal and oil, while another ten percent is produced from burning natural gas. The burning of these fossil fuels releases carbonaceous (CO, HCs) and nitrous gases (NO, $NO_2$, $NO_3$, $HNO_2$, etc.), as well as sulfur dioxide ($SO_2$), into the atmosphere, contributing to urban smog, although usually at lower levels than the aforementioned conventional solid waste burning plants. The operations of many fossil fuel electrical generating plants, particularly coal burning plants, are restricted to a certain number of hours per day, because full-time operation would otherwise exceed legal pollution limits.

Conventional industrial furnaces, used to produce heat and electrical power for manufacturing processes, also emit flue gases into the atmosphere.

A major source of air pollution is nitrogen oxides (NO, $NO_2$, $NO_3$, $HNO_2$, etc.). Ambient air is composed of 79 percent nitrogen, and nitrogen oxides are commonly contained in flue gases resulting from open-air combustion processes. For readily combustible fuels, like natural gas, the formation of nitrogen oxides can be reduced, but not eliminated entirely, by using a lean fuel-to-air ratio. Flue scrubbers can be incorporated into plants to remove nitrogen oxides (as well as $SO_2$ and other pollutants) from the exhaust prior to release into the environment.

In U.S. Pat. No. 6,066,825, Titus et al. describe a system for generating electricity from the conversion of solid waste material into a gaseous fuel followed by combustion in a turbine or other generator. The conversion of the waste material involves a combination of an electric arc plasma furnace and a joule-heated melter. The plasma furnace is operated such that fast pyrolysis of the waste material occurs, creating a mixture of mostly CO and $H_2$, with small amounts of $CH_4$ and other light HCs, and a small amount of $CO_2$. Non-gaseous components of the pyrolysis product are vitrified by the joule-heated melter into a highly stable glass product that can be disposed of safely or used commercially. The fuel gases are preferably combusted using a lean fuel-air mix in a steam-injected compressor-gas turbine or in an internal combustion engine, so as to produce electricity.

An object of the present invention is to provide an improved waste treatment and power production facility capable of converting solid waste materials to useful energy (heat and electricity) and marketable commercial products with zero air pollution emissions, the operation of which is largely or entirely self-powered.

DISCLOSURE OF THE INVENTION

The object has been met by a solid-waste energy plant containing a series of catalytic ionic-impact chambers to convert carbon-based waste material into fuel gas and also to regenerate the flue gases that are the product of combustion in turbine generators. The plant operates largely as a closed system to eliminate emission of flue gases into the atmosphere. Excess regenerated fuel and other useful waste conversion products can be separated and sold commercially.

The plant receives carbon-based waste material in a first catalytic ionic-impact chamber, which uses an electric arc to subject the waste material to homolytic bond cleavage, breaking the molecular bonds and leaving a plasma gas, which then recombines into simple molecules of $H_2$, $CH_4$, CO, $CO_2$, $S_2$, $H_2S$, etc. The exact mix of resultant gases depends upon the composition of the waste material input into the chamber and choice of operating parameters, but it is mostly $H_2$ and CO, and is a medium grade fuel gas. The sulfurous components, if present, are removed by a scrubber and the elemental sulfur sold commercially, as is any glassy or metallic slag material recovered from the bottom of the first chamber. The scrubbed gas can be further energized by passage through a second ionic-impact chamber filled with incandescent coke (derived from high-carbon waste, such as shredded rubber tires). There, $H_2O$ is converted to $H_2$ and CO, while $CO_2$ is converted to CO, through reaction with the carbon in the incandescent carbonaceous materials. After combustion of the energized fuel gas in a turbine, which generates electricity for the plant, the flue products of $CO_2$ and $H_2O$ are cycled to another ionic-impact chamber, also filled with incandescent coke, for regeneration back into medium grade fuel gas of $H_2$ and CO. Excess gases may be converted in yet other ionic-impact chambers to $H_2$ and $CH_4$ and sold commercially. Excess $CO_2$ could also be sold.

In this way, solid waste material that would otherwise be disposed in landfills is converted into fuel for energy generation. High-carbon wastes, like rubber tires, which are normally difficult to convert directly into gaseous fuel in arc plasma chambers because of their relatively low oxygen content, are used for flue gas regeneration and thereby effectively converted into energized fuel gas. The energized fuel operates turbine generators for supplying the electric power for the electric arcs that heat the reaction chambers, as well as for sale of the excess electricity generated. The zero-emission closed system eliminates air pollution, as all products are extracted for commercial sale.

BRIEF DESCRIPTION OF THE DRAWING

FIG. 1 is a schematic plan view of the solid-waste energy plant of the present invention.

BEST MODE OF CARRYING OUT THE INVENTION

With reference to FIG. 1, the illustrated solid-waste energy plant recycles solid-waste by converting it into usable energy and commercial byproducts. The plant operates in five main stages. Three of the stages involve the use of catalytic ionic-impact chambers. Another stage uses the synthetic fuel gases produced by the ionic-impact chambers for the conventional generation of electricity in turbine generators, but with the flue gases being recycled instead of being released into the atmosphere. Yet another stage involves the conventional scrubbing and cleaning of gases using standard off-the-shelf technology.

Stage 1: Waste Dissociation

Solid waste 1 is collected, shredded by conventional methods, and fed into the first of the catalytic ionic-impact chambers 100. Solid waste 1 may include industrial, medical, agricultural or municipal waste, as well as sewer sludge. The undifferentiated waste that is collected is preferably sorted to some extent to remove obviously non-carboniferous matter, such as bulk glass and aluminum recyclables. For example, a magnetic separator 3 might be used to extract ferrous metals. The sorted waste would then be largely carbon-based matter before being fed into a shredder 4. Shredded waste is continuously fed, e.g., via conveyor belts 2 and feed hoppers and auger feed 5, into the primary ionic-impact chamber 100. Inside this chamber 100, the waste is reduced by an electric arc to a plasma, the gaseous product is drawn off at the top 8 of the chamber, while molten metals and vitrified slag are drawn off at the bottom 6 of the chamber and sulfur condensing from the gas is drawn off at the scrubber 11. This nongaseous product 7 can be sold as base metal for further refining, as sulfur for use in the chemical industries, and as industrial sand for use in roadbeds and the like.

Within the first chamber 100, an electric arc is emitted between carbon rod electrodes. Within the arc that extends between the tips of the rods, carbon-based material is hammered apart or broken down first into smaller molecular components and ultimately into its atomic constituents, forming a plasma. Plasma temperatures created within the electric arc typically exceed 5600° C. As the excited atoms and ions leave the plasma, they recombine into simple molecules of $H_2$, $CH_4$, Co, $CO_2$, $S_2$, $H_2S$, etc. (Most of the gaseous sulfur then condenses out as the gas cools away from the electric arc and plasma as it passes through scrubber 11.) This electric arc molecular milling process releases energy in the form of heat as the large molecules from higher states of chemical equilibrium (primarily solids and liquids) are broken down to simple gas molecules with more tightly bound configurations and lower state of equilibrium, after being sufficiently excited and completely decomposed. All of the carbon-based material is converted in this way. Hazardous and semi-hazardous medical or industrial materials are rendered harmless in this first stage chamber.

This ionic impact or hammering process differs from incineration in which the large molecules of matter in the solid waste are burned or combusted in the presence of ambient air and applied heat (flame). This process also differs from conventional pyrolysis or gasification techniques in which application of external heat to the waste in an oxygen starved environment causes the molecules in the carbon-based matter to break down. Instead, the arcing electricity and resultant ionic impacts in the plasma cause the bond cleaving and molecular breakdown, and the heat is a byproduct of the breakdown and subsequent recombinations into smaller more tightly bound molecules. The generated heat from this chamber or from the hot gases drawn from the chamber can be used to drive steam turbines through heat exchange.

Stage 2: Carbon Energizing of the Gas

Gaseous products 8 from the first ionic-impact chamber 100 are directed into one or more second catalytic ionic-impact chambers 200, which are filled with incandescent coke in the form of high-carbon-based waste, such as shredded rubber tires. The number of second chambers 200 will vary depending on such variables as the number of gas turbines 14 in service, which dictates the gas volume required. As in the first stage chamber (or chambers) 100, the high-carbon-based waste material is subjected to the ionic-impact process, i.e. electric arcing between electrodes, which reduces the carbon-based molecules to a plasma 'gas'. Again, the chemical equilibrium change creates heat. The raw incoming gas 8 ducted from the first chamber 100 into the second chamber 200 mixes with the plasma gas (largely carbon atoms and ions), with further catalytic ionic-impact processing and molecular state changes occurring.

$$CO_2 + C \rightarrow 2CO$$

$$H_2O + C \rightarrow H_2 + CO$$

$$2H_2 + C \rightarrow CH_4$$

These reactions are endothermic and add energy to the molecular gas products, with the energy supplied by the electric arc that excites the high carbon waste to a plasma and by the consequent recombination heat from the breakdown and equilibrium change. As a result of the reactions in these second chambers 200, much of the $CO_2$ and $H_2O$ from the waste decomposition process becomes reconstituted as CO, $CH_4$, and $H_2$. Gas exit temperatures typically exceed 1900° C. The gas 9 emitted from the second chambers 200 is a mole percent mixture (dependent on the solid waste composition) of approximately 60% $H_2$, 36% CO, and 4% $CH_4$. This is a medium grade fuel usable by gas turbines 14.

At this point, recycled flue gases 18 that have been regenerated (stage 4 below) enter the fuel stream via a valve 10. All of these fuel gases are scrubbed 11 to remove any residual sulfur compounds (especially $SO_x$), sodium, or nitrogen compounds. These extracted chemicals 12 can be sold commercially, for example as sulfuric acid, nitric acid, and nitrate fertilizers, or if not available in sufficient quantity, can be neutralized.

Stage 3: Electricity Generation

The heat from the catalytic ionic-impact chambers 100, 200 and 300 and the synthetic fuel gas 9 and 18 produced by them can be used to generate electricity using conventional turbine generating means 14, 15a and 15b, with the difference that resulting combustion products will not be released into the atmosphere, but instead be recycled and regenerated. The heat from the ionic-impact chambers 100, 200, 300, etc., and from the hot output gases 9 and 18 drawn from those chambers can be used with heat exchangers 13a and a closed-loop water-to-steam system to drive one or more steam turbines 15a and 15b. The fuel gases 9 and 18 can be burned in gas-driven turbines 14. The hot flue gases from the fuel combustion in the gas turbines 14 can also be used with heat exchangers 13b to drive one or more steam turbines 15a and 15b. All of the turbines 14, 15a and 15b generate electricity for internal plant use and for commercial sale. Gas and steam turbine electrical generation is well known in the art.

It is noted that the decomposition of solid waste 1 is unlikely to provide all of the oxygen needed for complete combustion of all of the fuel gases burned in the plant, except possibly where a large portion of the fuel is drawn off 24 and 27 in stage 4 described below and sold commercially. The oxygen available from the decomposition and energizing is already bound up in the CO in the fuel gas. (Otherwise, if the waste material contained enough oxygen, the recombination products from the ionic-impact chambers would already be almost entirely $CO_2$ and $H_2O$, and then no further energy could be extracted from the product gases via combustion.) Combustion of the CO, $H_2$ and $CH_4$ in the fuel gas requires an additional source of oxygen. One source of additional oxygen is available from the methane plant 22 described below for stage 4. Also, a conventional source of additional oxygen for combustion of the fuel gas in the conventional gas turbine(s) is ambient air (about 20% oxygen). A lean fuel-air mix could be used in the turbines to minimize nitrogen oxide formation. Any nitrogen oxides that are formed would not be released into the atmosphere because the flue gases are recycled. The nitrogen oxides could then be removed by scrubbers. Alternatively, some of the heat generated in the plant could be used to run an oxygen plant 23 for nitrogen separation and removal from the ambient air (e.g., by liquefaction) prior to intake of the oxygen into the turbines. This would eliminate nitrogen oxide formation altogether, and the separated liquid nitrogen is a commercial product that could be sold or make ammonia to be used in the manufacture of urea that is used as an ingredient in fertilizer.

Stage 4: Flue Gas Regeneration

As noted above, the flue gases produced in the turbine(s) are captured and channeled back into one or more reprocessing chambers 300. (The number of chambers required to optimize gas masses depends on the mix of waste consumed, the number of generators used, and the desired output of commercial gases.) Again, these chambers 300 are catalytic ionic-impact chambers filled with high carbon waste. The flue gases are regenerated in these chambers 300, i.e. energized with more carbon as in stage 2, to create more medium grade fuel gas 18 of CO and $H_2$, with some $CH_4$. (Refer again to the reactions set forth in the above description of stage 2.) After regeneration the fuel gas 18 can be returned 10 to the fuel stream 9, scrubbed 11 and sent again through the gas turbine(s) 14.

Alternatively, some or all of the flue gas components (e.g., $CO_2$) and regenerated gas components (especially the $CH_4$ and $H_2$) can be cooled, separated, scrubbed and sold as commercial gas. Flue gases may be routed by a valve 16 to a conventional scrubber-separator 17, which extracts some of the $CO_2$ for industrial use. The remaining $CO_2$ and water vapor may be returned to the flue stream for regeneration in the aforementioned ionic-impact chambers 300. Regenerated gas 18 may be passed through a valve 19, cooled in a heat exchanger 13c, and sent to a hydrogen separator 20, where $H_2$ is captured and passed through another valve 24 for commercial sale. Or the captured $H_2$ may be converted to $CH_4$ ($2H_2+C\rightarrow CH_4$) in yet another catalytic ionic-impact chamber 400 filled with incandescent coke (high carbon waste), passed through a scrubber 26, cooled in a heat exchanger 13d and sold commercially. The steam from the heat exchanger 13d may drive a steam turbine 15c. (The heat from any of the heat exchangers 13a–13d may be used to generate steam to drive steam turbines 15a–15c and generate electricity, with the water and steam circulating in a closed loop.) Returning to the regenerated gas 18, after separation 20 of the hydrogen, the remaining CO plus steam from a heat exchanger 13c may be introduced into a methane conversion chamber 500, which is yet another catalytic ionic-impact chamber. There the reaction is:

$$2CO+4H_2O \rightarrow 2CH_4+3O_2$$

The reaction is endothermic and the energy is provided by both the electric arc and the heat contained in the steam. The recombining of carbon monoxide with water vapor to produce methane and oxygen (a kind of reverse combustion) occurs at elevated temperatures. The resulting methane and oxygen are then separated 22. The methane may be captured at a valve 27 and sold to a natural gas distributor. The oxygen derived from the methane conversion process may be directed from the separator 22 to an oxygen plant 23 were it can be used to enhance combustion of the fuel gases 9 and 18 in the gas turbines 14. This results in a cleaner burn with substantially reduced nitrogen oxide production. Alternatively, the oxygen might be captured and sold.

Stage 5: Scrubbing of Gases

Conventional technology is used to clean the gases at various points (e.g. 11 and 26) in the plant. Impurities removed from the gas may constitute commercially sellable products. If not, they can be neutralized and safely disposed. Sludge from any of the scrubbers might be drawn off and reintroduced into the first stage chamber 100, where it can be reprocessed into vitreous slag 7.

$CO_2$, a product of combustion, can be converted 17 into dry ice and sold. Or it might be sequestered using technologies currently being developed or to make urea. Nitrogen oxides ($NO_x$) can be converted 11 into nitric acid or nitrate fertilizers and sold commercially. Likewise, sulfur oxides can be converted 11 into sulfuric acid or sulfate compounds and sold commercially.

$H_2$ and $CH_4$ gases created in stage 4 can be extracted from the gas mix in a conventional gas separation process (e.g., at 20 and 22), and cleaned for commercial sale.

Conclusion

By carrying out these five stages in a plant like that shown and described, solid waste material can be converted to usable products, including fuel gas. Electrical power generation can be produced cleanly in a closed system characterized by zero pollution emissions into the atmosphere. The key to this waste conversion is the breakdown of solid waste molecules to simpler gases by means of catalytic ionic-impact chambers 100, 200, 300, 400 and 500 using an electric arc and resulting hot plasma ions to cause homolytic bond cleavage followed by exothermic recombination. Even high carbon wastes can be converted in such chambers by chemical reactions between the gases and incandescent carbon to energize and regenerate more fuel gas. Reaction heat is recovered by heat exchangers and the steam used to generate electricity. A very clean and efficient waste conversion and power generation plant is the result.

What is claimed is:

1. A solid-waste conversion plant, comprising:
    a first ionic-impact chamber having a pair of electrodes for establishing an electric arc therebetween, carbon-based solid waste introduced into said chamber being molecularly broken down by homolytic bond cleavage by said electric arc and forming an ionic plasma of atomic constituents of said solid waste, said constituents exothermically recombining into simple gaseous molecules including CO and $H_2$ upon leaving said ionic plasma in said electric arc with release of heat, other constituents forming a solidifiable material extractable from the bottom of said chamber;
    a second ionic-impact chamber having a pair of electrodes for establishing an electric arc therebetween, said second chamber filled with high carbon waste which is broken down by said electric arc to an incandescent coke, gaseous molecules from said first chamber, including $CO_2$, $H_2O$ and $H_2$, being energized by said coke and converted in said chamber to CO, more $H_2$ and $CH_4$, thereby forming a fuel gas;
    at least one gas turbine generator combusting said fuel gas to generate electricity sufficient at least to run said electric arcs in said chambers; and a third ionic-impact chamber forming a flue gas regenerator, the ionic-impact chamber connected to a flue outlet of the gas turbine generator to receive combustion products therefrom for regeneration in said chamber, the third ionic-impact chamber having a pair of electrodes for establishing an electric arc therebetween, and being filled with high carbon waste which is broken down by said electric arc to an incandescent coke through which the combustion products pass and are converted into a fuel gas containing CO and $H_2$;

wherein said conversion plant forms a closed system with recycled flue gases and zero gas emissions into the atmosphere, excess fuel gas produced by the solid waste breakdown and conversion in said chambers being extractable from said plant.

2. The conversion plant of claim 1 wherein said high carbon waste comprises shredded rubber tires.

3. The conversion plant of claim 1 further comprising at least one closed-loop water/steam heat exchanger system drawing heat from the hot gases exiting one or more of the chambers, said closed-loop water/steam heat exchanger system driving one or more steam turbine generators.

4. The conversion plant of claim 1 further comprising at least one conventional scrubber system connected to remove impurities from said gases exiting one or more of the chambers.

5. The conversion plant of claim 1 wherein the solidifiable material extractable from the bottom of the first ionic-impact chamber comprises at least one of molten metals and vitreous slag.

6. The conversion plant of claim 1 wherein a conventional $CO_2$ separator is located in the path of flue gases from said gas turbine generator, whereby at least some $CO_2$ in the flue gases can be extracted.

7. The conversion plant of claim 1 wherein at least some regenerated fuel gas output from said third chamber is recirculated to fuel gas input into at least one gas turbine, generator.

8. The conversion plant of claim 1 wherein at least some regenerated fuel gas output from said third chamber is drawn off to a hydrogen separator, wherein $H_2$ in said fuel gas is removed therefrom.

9. The conversion plant of claim 8 further comprising a fourth ionic-impact chamber in a path to receive the removed $H_2$, the fourth chamber having a pair of electrodes for establishing an electric arc therebetween, the fourth chamber filled with high carbon waste which is broken down by said electric arc to an incandescent coke, wherein the $H_2$ is converted in said fourth chamber by said incandescent coke to $CH_4$.

10. The conversion plant of claim 9 wherein heat from hot $CH_4$ exiting said fourth chamber drives a steam turbine generator via a closed-loop water/steam heat exchanger system cooling the $CH_4$.

11. The conversion plant of claim 8 wherein steam and CO remaining after said $H_2$ has been removed from said fuel gas is received in a fifth ionic-impact chamber having a pair of electrodes establishing an electric arc therebetween, wherein said steam and said CO are converted to $CH_4$ and $O_2$ in said fifth chamber.

12. The conversion plant of claim 11 further comprising an $O_2$ separator removing said $O_2$ from the $CH_4$, said $O_2$ being supplied to at least one gas turbine generator.

13. The conversion plant of claim 1 wherein said electric arcs in said second and third ionic-impact chambers and heat from incoming gases facilitate at least the following three endothermic chemical reactions with the incandescent coke:

$$CO_2 + C \rightarrow 2CO;$$

$$H_2O + C \rightarrow H_2 + CO;$$

and $$2H_2 + C \rightarrow CH_4.$$

14. A method of converting carbon-based solid waste to usable products and energy, comprising:

introducing said carbon-based solid waste into a closed-system conversion plant containing at least first, second and third ionic-impact chambers, each ionic-impact chamber having a pair electrodes therein establishing an electric arc therebetween, said second and third chambers being filled with high carbon waste which is broken down by said electric arc into incandescent coke, the carbon-based solid waste introduced into said first chamber being molecularly broken down by homolytic bond cleavage by said electric arc and forming an ionic plasma composed of atomic constituents of said solid waste, said constituents exothermically recombining into simple gaseous molecules including CO and $H_2$ upon leaving said ionic plasma in said electric arc with release of heat, other constituents forming a solidifiable material extractable from the bottom of said chamber;

energizing said gaseous molecules from said first chamber by means of passage of said gaseous molecules through said incandescent coke in said second chamber, whereby $CO_2$, $H_2O$ and $H_2$ in the gas is converted in the second chamber to CO, more $H_2$ and $CH_4$ thereby forming a fuel gas;

combusting at said fuel gas to generate electricity sufficient at least to power said electric arcs in said chambers;

regenerating flue gas products of the combustion in the third chamber, whereby $CO_2$ and $H_2O$ in said flue gas is converted to CO, $H_2$ and $CH_4$ by passage of said flue gas through the incandescent coke in said third chamber; and separately extracting at least some of the $CO_2$, $H_2$ and $CH_4$ from the closed-system conversion plant.

15. The method of claim 14 further comprising using heat generated by said chambers to drive steam turbine generators by means of a closed-loop water/steam heat exchanger system cooling hot gases exiting said chambers.

* * * * *

UNITED STATES PATENT AND TRADEMARK OFFICE
CERTIFICATE OF CORRECTION

PATENT NO. : 6,686,556 B2
DATED : February 3, 2004
INVENTOR(S) : C. Kenneth Mitchell et al.

It is certified that error appears in the above-identified patent and that said Letters Patent is hereby corrected as shown below:

Title page,
Item [76], Inventors, should read as follows:
-- [76] Inventors: C. Kenneth Mitchell, Las Vegas, NV (US); Fernando J.R. Herrera, San Francisco, CA (US) --.

Signed and Sealed this

Fifth Day of April, 2005

JON W. DUDAS
*Director of the United States Patent and Trademark Office*